(12) United States Patent
Pekarsky et al.

(10) Patent No.: US 8,925,581 B2
(45) Date of Patent: Jan. 6, 2015

(54) HYDRAULIC SUCTION LINE

(75) Inventors: Lev Pekarsky, West Bloomfield, MI (US); Vladimir Yasnogorodskiy, Sterling Heights, MI (US); Brandon D. Lint, Dexter, MI (US); David P. Aeschliman, Whitmore Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 318 days.

(21) Appl. No.: 13/561,646

(22) Filed: Jul. 30, 2012

(65) Prior Publication Data

US 2014/0028022 A1    Jan. 30, 2014

(51) Int. Cl.
   *E03B 11/00*    (2006.01)
(52) U.S. Cl.
   USPC ........................................... 137/592; 285/208
(58) Field of Classification Search
   USPC ....................... 137/590, 592; 285/205–208
   See application file for complete search history.

(56) References Cited

U.S. PATENT DOCUMENTS

| | | | |
|---|---|---|---|
| 4,364,517 A | 12/1982 | Etheridge et al. | |
| 4,765,507 A * | 8/1988 | Yavorsky et al. | 220/590 |
| 5,988,134 A | 11/1999 | Smietanski | |
| 6,041,752 A | 3/2000 | Van Klompenburg | |
| 6,241,485 B1 * | 6/2001 | Warwick | 417/300 |
| 6,742,490 B2 | 6/2004 | Meisner | |
| 7,237,807 B2 * | 7/2007 | Hiyama et al. | 285/141.1 |
| 7,296,590 B2 | 11/2007 | Kitagawa | |
| 7,475,563 B2 * | 1/2009 | McCarrell | 62/420 |
| 2006/0022458 A1 * | 2/2006 | Droste et al. | 285/206 |

* cited by examiner

*Primary Examiner* — Craig Schneider
*Assistant Examiner* — Angelisa Hicks
(74) *Attorney, Agent, or Firm* — James Dottavio; MacMillan, Sobanski & Todd, LLC

(57) ABSTRACT

A pump suction line assembly includes a sump including a wall formed with a bore and a seat, a tube including an inlet, an outlet, a length connecting the outlet and inlet, and a flange contacting the seat, a housing, a seal fitted in the bore and contacting the flange and the housing, and fasteners that compress the seal, secure the tube to the wall, and secure the sump to the housing.

10 Claims, 2 Drawing Sheets

HYDRAULIC SUCTION LINE

BACKGROUND OF THE INVENTION

1. Field of the Invention

This invention relates generally to power hydraulic systems and more specifically to a suction hydraulic line that connects a fluid sump with an inlet of a hydraulic pump mounted externally of a fluid sump especially for an automatic transmission.

2. Description of the Prior Art

A suction line for a hydraulic pump is required if the hydraulic pump is located externally from a housing containing a sump whose fluid level is lower than the pump's inlet. A suction inlet line is typically located close to the bottom of a sump to avoid suction of air when the fluid level is low.

A suction line may be attached to the sump's internal wall by means of internally located seals and fasteners. The sump wall may include an opening to the external side, which is also sealed externally to provide an interface with the manifold of the pump assembly.

A suction line in this arrangement is required when an L-shaped suction line conducts fluid from the bottom of the sump to the side wall. The suction line must prevent movement in the vertical direction by means of additional fasteners.

But in many instances access to the interior of the sump is restricted by other components or internal features inside the housing making the manufacturing and installation process difficult and time consuming. External and internal seals are required, which seals increase the potential for leakage and high cost. An internal attachment of the suction line requires additional space for a flange and fasteners, which may not be available if the external hydraulic unit must be attached to an existing assembly.

SUMMARY OF THE INVENTION

A pump suction line assembly includes a sump including a wall formed with a bore and a seat, a tube including an inlet, an outlet, a length connecting the outlet and inlet, and a flange contacting the seat, a housing, a seal fitted in the bore and contacting the flange and the housing, and fasteners that compress the seal, secure the tube to the wall, and secure the sump to the housing.

A method for installing the suction line includes inserting the suction line into a bore formed in a sump, fitting a flared length of the suction line into the bore, seating a flange of the suction line against the sump at the bore, inserting a seal between the flange and a housing, and using fasteners to compress the seal, secure the suction line to the sump, and secure the sump to the housing.

The pump suction line assembly provides means for installing into a sump an L-shaped suction tube with a single seal and minimum size opening in the wall of the sump.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
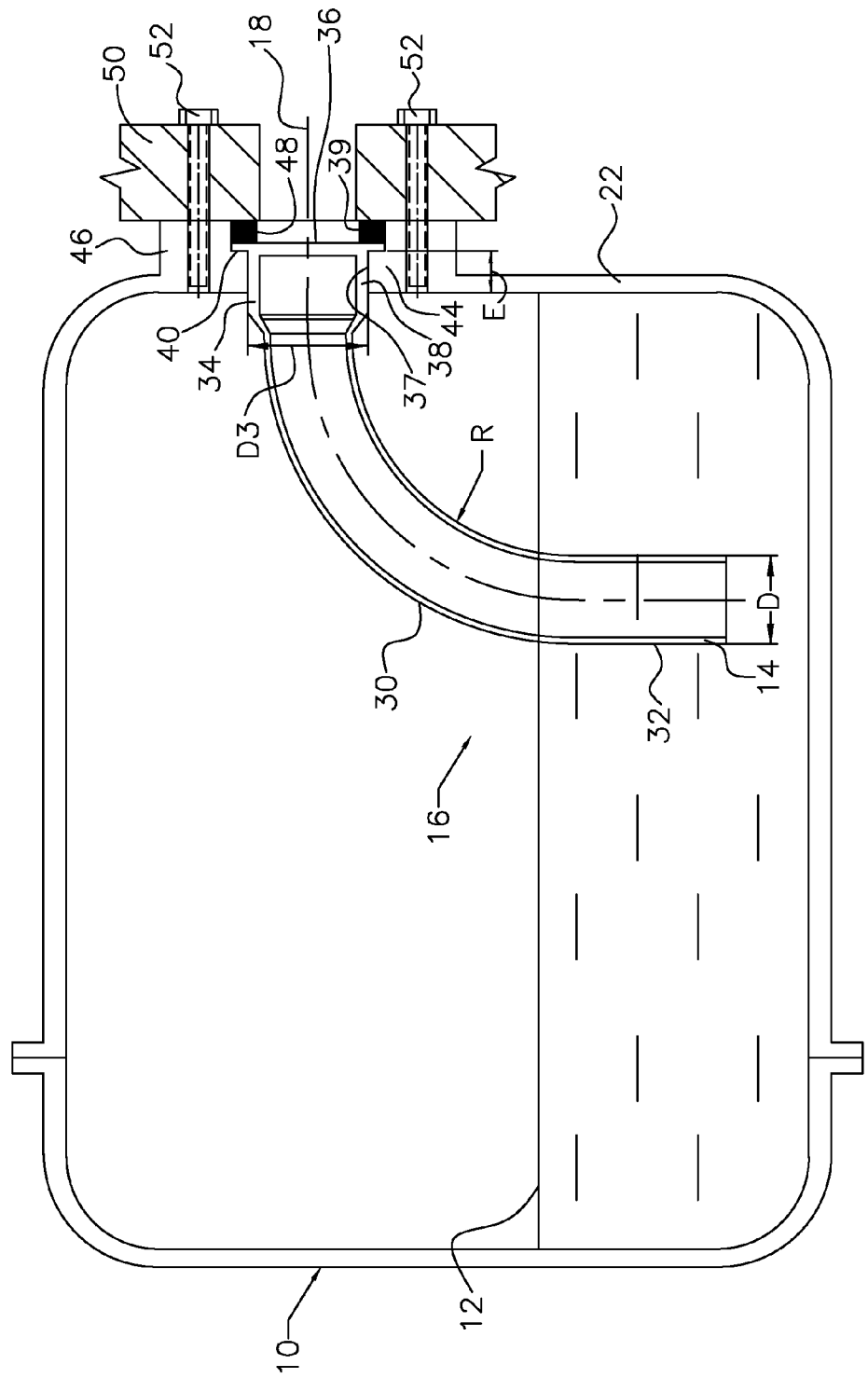
FIG. 1 is a side view of a suction line assembly installed in a sump.
Figure 2:
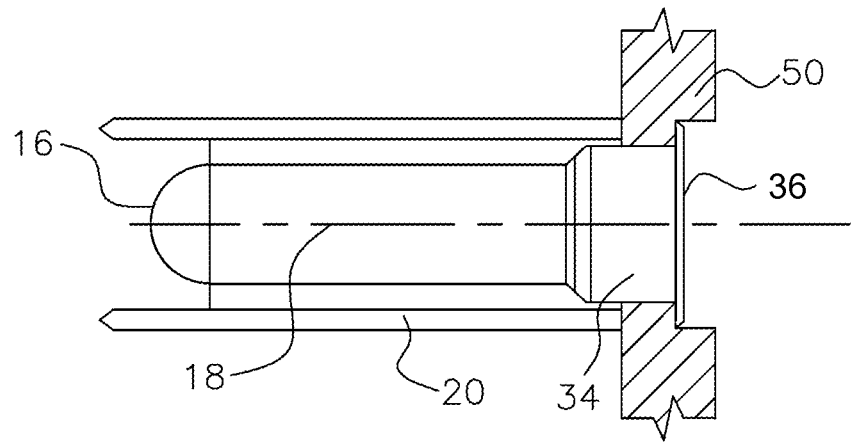
FIG. 2 is a top view showing outlet of the suction line fitted on the pump manifold flange.

FIGS. 1 and 2 show a sump 10 containing hydraulic fluid whose upper surface 12 is higher than the inlet 14 of a suction line 16. Suction line 16 is preferably a hollow thin walled tube having a circular cross section. The suction line 16 is restricted from rotation about axis 18 by a slot 20 formed in the sump wall 22.

The suction line 16 is formed with a 90 degree arcuate length section 30, preferable having a constant radius; a straight section 32, which extends between suction line 16 inlet 14 and the arcuate length section 30; and a second straight section 34, which extends between the outlet 36 and the arcuate length section 30. Straight section 34 is formed with a flare 38, which has a larger diameter than the diameter of the arcuate length section 30. The outlet 36 of suction line 16 is encircled by a radial seating flange 40.

The wall 22 of the sump 10 is formed with a bore 37 aligned with axis 18, and a counter bore 39 aligned with the bore. The suction line 16 is inserted through the bore 37 and counter bore 39 such that radial seating flange 40 is brought into contact with a shoulder 44 on a boss 46 formed in the sump wall 22 where the bore 37 and counter bore 39 meet. A compression seal 48 is located between radial seating flange 40 and a housing 50, located outside the sump 10, such as a pump manifold. Mechanical fasteners 52 engage screw threads in the boss 46. The fasteners 52 compress seal 48 between radial seating flange 40 and the housing 50, secure the suction line 16 to the sump wall 22, and secure the sump 10 to the housing 50.

The outer diameter of straight section or flair 34 is substantially equal to the diameter of the bore 37, thereby allow vertical alignment of the suction line 16. The radial seating flange 40 is preferably marked with a symbol (not shown) indicating the direction of the bend in the arcuate length section 30 of the tube 16 or the plane of the arcuate length section.

The outer diameter of the compression seal 48 is equal to or slightly smaller than the inner diameter of counter bore 39, thereby providing a reliable preloaded hydraulic seal among the bore 37, radial seating flange 40 and housing 50, when the fasteners 52 are tightened.

Figure 3:
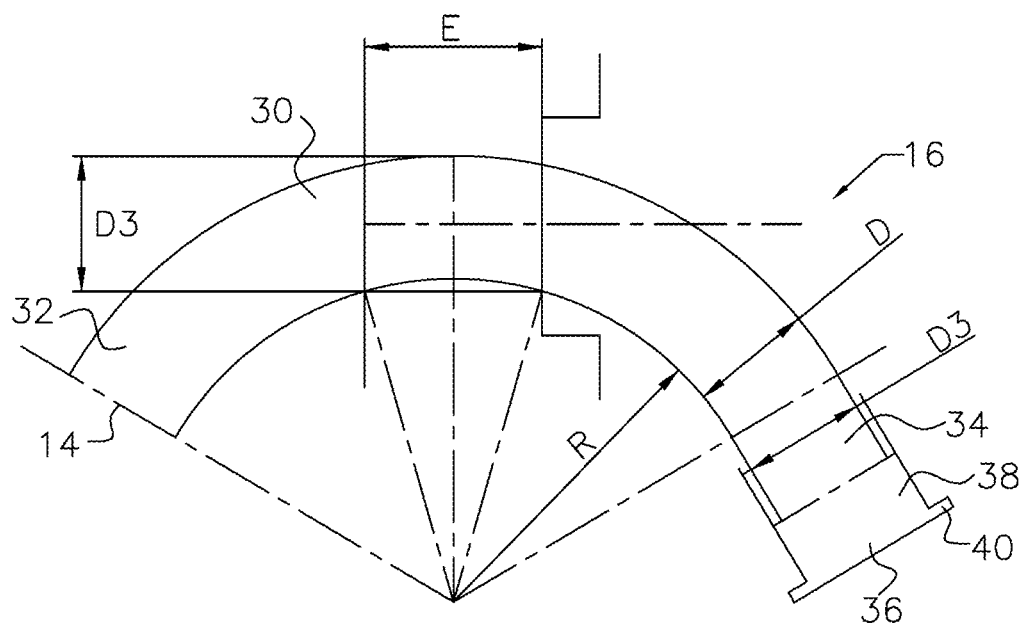
FIG. 3 is a side view of a suction line assembly with a minimum radius of curvature.

As shown in FIGS. 1 and 3, the internal radius R of the arcuate length section 30 of the suction line 16 is a function of the outer diameter D of suction tube 16, the inner diameter D3 of the bore 37 in boss 46, and the depth E of the bore 37, i.e., the axial length of bore 37, as defined by the formula $$R = \frac{E^2/4 + (D3 - D)^2}{2(D3 - D)}$$

To reduce the suction line internal radius R and distance from suction line inlet 14 to the housing wall, the depth E of the bore 37 should be reduced and the difference between the outer diameter of the flare 34 and the outer diameter of the suction line 16 should be increased.

The method of installing the suction line and securing it to the shoulder 44 includes inserting the suction line into the bore formed in shoulder 44 of the boss 46, fitting the outer diameter of the flare 38 into the bore, radial seating flange 40 against the flat surface of the counter bore in shoulder 44, inserting compression seal 48 between radial seating flange 40 and housing 50, and securing fasteners 52 between housing 50 and the boss 46.

The equation can be used to calculate the minimum bend radius R of the suction line 16 that can be freely inserted into housing bore depending on the outer diameter D3 of flare 38, the outer diameter D of the suction line outer diameter, and the depth E of the shoulder 44 in sump wall boss 46.

In accordance with the provisions of the patent statutes, the preferred embodiment has been described. However, it should be noted that the alternate embodiments can be practiced otherwise than as specifically illustrated and described.

The invention claimed is:

1. A pump suction line assembly, comprising:
   a sump including a wall formed with a bore and a seat;
   a tube including an inlet, an outlet, a length connecting the outlet and inlet, and a flange contacting the seat;
   a housing;
   a seal fitted in the bore and contacting the flange and the housing;
   fasteners that compress the seal, secure the tube to the wall, and secure the sump to the housing; and
   wherein the length is an arcuate length having an interior radius R determined by $$R=(E^2/4+(D3-D)^2)/(2(D3-D))$$

wherein D is an outer diameter of the arcuate length of the tube, D3 is an inner diameter of the bore, which is larger than D, and E is a depth of the bore.

2. The assembly of claim 1, wherein:
   the flange surrounds the outlet, and
   the arcuate length connects the outlet and an inlet.

3. The assembly of claim 1, wherein:
   the tube includes a length having an outer diameter that is larger than an outer diameter of the arcuate length and fits inside the bore.

4. The assembly of claim 1, wherein sump includes a slot that limits rotation of the tube about an axis that is aligned with the bore.

5. The assembly of claim 1, further comprising a counter bore aligned with the bore and formed in the wall, an outer diameter of the flange fitted in the counter bore.

6. A pump suction line assembly, comprising:
   a sump including a wall formed with a bore, a counter bore aligned with the bore, and a seat;
   a tube including an inlet, an outlet, an arcuate length connecting the outlet and the inlet, and a flare fitted in the bore, and a flange contacting the seat;
   a housing;
   a seal fitted in the counter bore and contacting the flange and the housing;
   fasteners that compress the seal, secure the tube to the wall, and secure the sump to the housing; and
   wherein the arcuate length has an interior radius R determined by $$R=(E^2/4+(D3-D)^2)/(2(D3-D))$$

wherein D is an outer diameter of the arcuate length of the tube, D3 is an inner diameter of the bore, which is larger than D, and E is a depth of the bore.

7. The assembly of claim 6, wherein the flange surrounds the outlet.

8. The assembly of claim 6, wherein the flare includes a length having an outer diameter that is larger than an outer diameter of the arcuate length and fits inside the bore.

9. The assembly of claim 6, wherein sump includes a slot that limits rotation of the tube about an axis that is aligned with the bore.

10. A pump suction line assembly, comprising:
    a sump including a wall formed with a bore and a seat;
    a tube including an arcuate length connecting an inlet to an outlet and a flange contacting the seat, wherein the length has an interior radius $R=(E^2/4+(D3-D)^2)/(2(D3-D))$, wherein D is an outer diameter of the arcuate length, D3 is a diameter of the bore, which is larger than D, and E is a bore depth.

* * * * *